United States Patent
Davis

(10) Patent No.: US 8,140,728 B1
(45) Date of Patent: *Mar. 20, 2012

(54) DATA PACKET ARBITRATION SYSTEM

(75) Inventor: Almir Davis, Quincy, MA (US)

(73) Assignee: EMC Corporation, Hopkinton, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/079,409

(22) Filed: Apr. 4, 2011

Related U.S. Application Data

(63) Continuation of application No. 11/645,332, filed on Dec. 23, 2006, now Pat. No. 7,930,456.

(51) Int. Cl.
*G06F 13/368* (2006.01)
*G06F 12/00* (2006.01)

(52) U.S. Cl. ........ 710/120; 710/107; 710/116; 710/240; 710/243; 710/244; 711/117

(58) Field of Classification Search .................. 710/120, 710/243
See application file for complete search history.

(56) References Cited

U.S. PATENT DOCUMENTS

| | | | | |
|---|---|---|---|---|
| 6,119,196 | A * | 9/2000 | Muller et al. | 710/243 |
| 6,385,678 | B2 * | 5/2002 | Jacobs et al. | 710/113 |
| 6,606,691 | B2 * | 8/2003 | Didier et al. | 711/151 |
| 7,120,714 | B2 * | 10/2006 | O'Connor et al. | 710/243 |
| 7,149,828 | B2 * | 12/2006 | Hayashi et al. | 710/120 |
| 7,302,510 | B2 * | 11/2007 | Fredrickson et al. | 710/243 |
| 7,447,817 | B1 * | 11/2008 | Sripada | 710/120 |
| 7,631,131 | B2 * | 12/2009 | Chen et al. | 710/243 |
| 7,688,324 | B1 * | 3/2010 | Auld et al. | 345/531 |
| 2007/0174529 | A1 * | 7/2007 | Rodriguez et al. | 710/240 |
| 2008/0059674 | A1 * | 3/2008 | Shi et al. | 710/243 |

* cited by examiner

*Primary Examiner* — Brian Misiura
(74) *Attorney, Agent, or Firm* — Krishnendu Gupta; Scott A. Ouellette; Gerald P. Kazanjian

(57) ABSTRACT

A data packet arbitration system for routing data transfers from a plurality of clients to a data transmission line is described. The system includes multiple arbitration stages for transferring data from the plurality of clients to the data transmission line. Data transfers are routed through the system based on arbitration logic that prioritizes by function in a primary arbitration stage and by client in a subsequent arbitration stage.

8 Claims, 4 Drawing Sheets

DATA PACKET ARBITRATION SYSTEM

CROSS-REFERENCE TO RELATED APPLICATIONS

This application is a Continuation of U.S. patent application Ser. No. 11/645,332 filed on Dec. 23, 2006 entitled "DATA PACKET ARBITRATION SYSTEM", now U.S. Pat. No. 7,930,456, issued on Apr. 19, 2011, the content and teachings of which are hereby incorporated by reference in their entirety.

FIELD OF THE INVENTION

The present invention is directed generally to a data transmission system and, more particularly, to a data transmission system having in which the transmission of data packets of different types from internal clients of the system to a transmission link are arbitrated based on the type of data packet and the priority assigned to the data packet.

BACKGROUND OF THE INVENTION

Serial-link I/O interconnect protocols, such as PCI-Express, are utilized in computing and communication platforms and systems to interconnect components of the platforms to enable efficient I/O transfers between the components. In many instances, it is necessary to transmit data packets from a root complex of the system to multiple internal clients of the system over the serial link. Likewise, it is necessary to transmit data packets from the multiple internal clients of the system to the root complex. Since the speed and efficiency with which the system can operate depends on the effective and efficient transfer of data packets through the system, it is necessary to arbitrate the transfers to give higher priority to certain of the types of data transfers.

SUMMARY OF THE INVENTION

The present invention is directed to a data transmission system in which the transmission of data packets is arbitrated based on certain properties of the data transfer packets, depending through which arbitration stage within the system the data transfer packets are attempting to pass to access a shared resource. The arbitration is not based on a single big arbiter but rather a set of smaller arbiters each having its own arbitration logic. The confirmation of available credits and other important arbiter mechanisms run dynamically as inputs to the system and statuses of transfers change. The arbitration schemes utilized allow a maximum control over client priorities when accessing the shared resource is architected in the way that allows an easy implementation of additional clients (functions). Due to its distributed nature, the system is also designed to enable easy and efficient changes to its arbitration logic, making it very adaptable to common arbiter's prioritization policy changes through the design process.

BRIEF DESCRIPTION OF THE DRAWINGS

These and other features of the invention will become more readily apparent from the following detailed description when read together with the accompanying drawings, in which.

DETAILED DESCRIPTION

Figure 1:
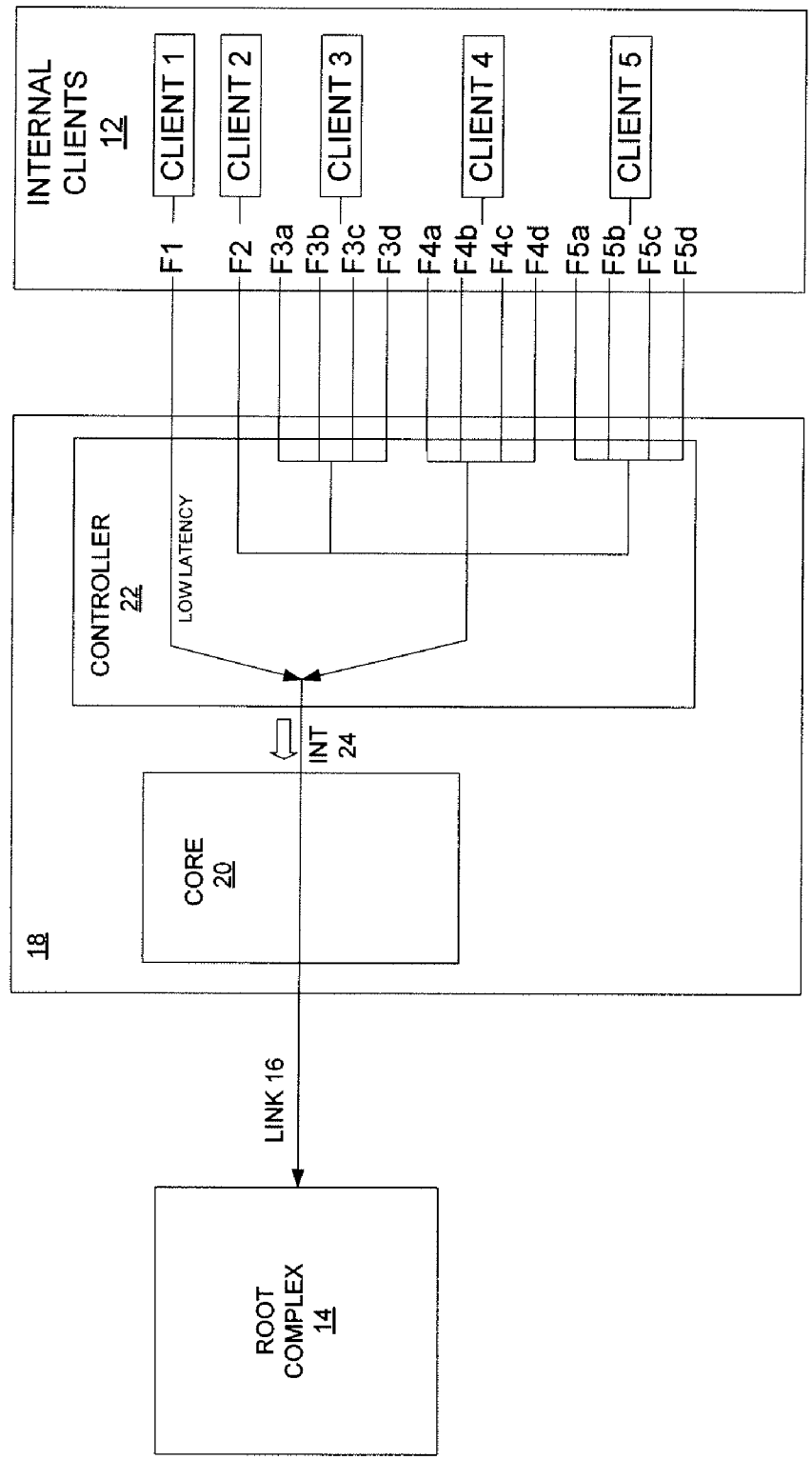
FIG. 1 is a schematic diagram of a data transmission system showing paths of data transfer packets from internal clients of the system to a root complex of the system.

FIG. 1 is a schematic diagram of a data transmission system 10 showing paths of data transfer packets from internal clients 12 of the system to a root complex 14 of the system 10 over transmission link 16. System 10 includes a data transfer device 18, including a protocol core 20 for performing protocol operations on data transfers between the internal clients 12, including CLIENT 1-CLIENT 5, and the root complex 14. In one example, the protocol may be the PCI-Express protocol. Data transfer device 18 further includes a controller 22 for routing data transfer packets from the internal clients 12 to the protocol core 20 over an interface 24. As shown in FIG. 1, CLIENT 1 includes a single function F1 that outputs data transfers. These data transfers are considered low latency transfers and, as is described below, are given top priority by controller 22 over all other data transfers when they are to be transferred to the interface INT 24. CLIENT 2 includes a single function F2 that outputs data transfers of a certain type that is different from the data transfers output by CLIENT 3, CLIENT 4 and CLIENT 5. In one embodiment, the data transfers output by function F2 are completions, which are also called "read response" transfers. CLIENT 3 includes multiple functions, and for the purpose of this description, these functions are shown as F3a, F3b, F3c and F3d. Likewise, CLIENT 4 and CLIENT 5 each include multiple functions F4a, F4b, F4c and F4d, and F5a, F5b, F5c and F5d, respectively. Each of these functions outputs write data transfers, or "posted" transfers, and read data transfers, or "non-posted" transfers.

Figure 2:
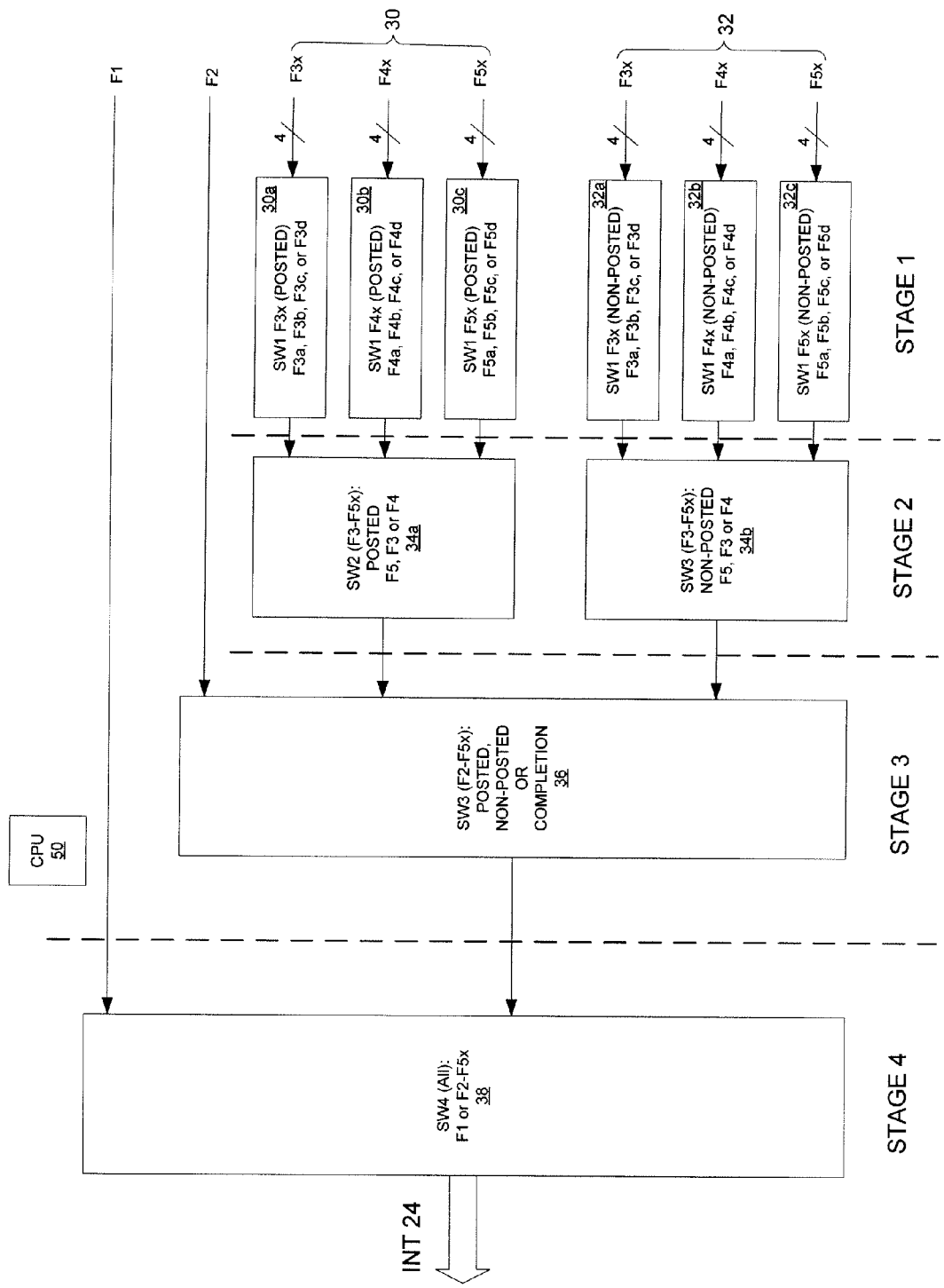
FIG. 2 is a schematic block diagram of the data transmission system showing switches that route data transfer packets from the clients to the transmission link.

As is shown in FIG. 1, there is a need to arbitrate among the many functions of CLIENT 1-CLIENT 5, to determine which data transfer will be granted access to the shared resource, interface INT 24. When many functions are requesting data transfers concurrently, the data transfer device 18 must be able to select which transfers will be granted access to the interface INT 24. FIG. 2 is a schematic diagram of the data transfer device 18, showing the switches involved in determining which data transfers will be passed on to the interface INT 24. Shown are the outputs of each of the clients CLIENT 1-CLIENT 5, which are input to data transfer device 18, as shown in FIG. 1. In Stage 1, the posted data transfer outputs of each function are routed to a switch device 30 and the non-posted data transfer outputs of each function are routed to a switch device 32. For simplicity, only one line from each function is shown in FIG. 2, with that line representing each of the 4 functions within the associated client. Therefore, posted data transfers from functions within CLIENT 3, which are indicted as F3x; with x representing one of clients a, b, c and d, are input to switch 30a. Likewise, posted data transfers from functions within CLIENT 4, which are indicted as F4x, with x representing one of clients a, b, c and d, are input to switch 30b, and posted data transfers from functions within CLIENT 5, which are indicted as F5x, with x representing one of clients a, b, c and d, are input to switch 30c. Similarly, non-posted data transfers from functions within CLIENT 3, which are also indicted as F3x, are input to switch 32a; non-posted data transfers from functions within CLIENT 4, which are indicted as F4x, are input to switch 32b; and non-posted data transfers from functions within CLIENT 5, which are indicted as F5x, are input to switch 32c.

Each of switches 30a-30c and 32a-32c operate in a similar manner and will therefore be referred to as SW1. As is described with reference to FIG. 3, each SW1 routes data transfers based on an arbitration scheme that can either select data transfers from functions in a "round robin" manner or, one or more functions may be given a higher priority over other functions. In one example, function d is given 50 percent of the bandwidth through SW1. In other words, SW1 will route data transfers there through in the order a, d, b, d, c, d, a . . . . In this example, the data transfer of function d will be switched through to the next stage 50 percent of the time. Accordingly, in Stage 1, data transfers are routed through based the function with which the transfer is associated.

Stage 1 takes advantage of WAIT signals to navigate the arbitration among all clients within the same functional group (for example F3a, F3b, F3c, and F3d). WAIT signals (one given to each group's client), are known in the art of data transfer systems, for example, the PCI Express Base Specification describes the implementation and operation of WAIT signals in a serial link system. The WAIT signal is basically a controller among all clients within the same group and it insures that only one client at a time gets permission to transfer data to the common memory (each FIFO in this case). Therefore, all WAIT signals going to clients will initially be asserted until there is a request assertion from a client within the group. If only one client requests a transfer, the WAIT signal to that particular client will be deasserted (provided there is enough buffer space for the new transfer), while all other WAIT signals going to other clients within the same group will stay asserted. Consequently, if there is more than one client requesting the same type transfer i.e. posted, or write, transfer of its data, there will be still only one client granted the access (by WAIT deassertion). Therefore, at any point of time there will be at most one WAIT signal within the same group and the same transfer type deasserted and all other WAIT signals will be asserted. Only one client (within the same group and the same transfer type) at a time can have access granted. Note that, because there are two SW4 switches per functional group i.e. switches 30 for posted transfers and switches 32 for non-posted transfers, if, for example, function F3a is requesting a posted transfer and function F3c is requesting a non-posted transfer, they are using 2 separate independent arbiters (30a, 32a). Therefore, they both might get an access to the data transfer device 18 (both WAIT signals deasserted). It is also important to note that SW1 switches 30a-30c and 32a-32c belonging to different functional groups are completely independent.

Stage 2 includes a switch 34a that receives, as inputs, the outputs of switches 30a, 30b and 30c and a switch 34b that receives, as inputs, the outputs of switches 32a, 32b and 32c. Therefore, switch 34a only receives posted data transfers and switch 34b only receives non-posted data transfers. Since each of switches 34a and 34b operate in a similar manner and will therefore be referred to as SW2. As is described with reference to FIG. 3, each SW2 switch 34a, 34b, routes data transfers based on an arbitration scheme that can either select data transfers from clients in a "round robin" manner or, one or more functions may be given a higher priority over other functions. In one example, CLIENT 5 is given priority over CLIENT 3 and CLIENT 4. In other words, SW2 will always route a data transfer associated with CLIENT 5 that it receives from switch 30c or 32c to Stage 3 before routing data transfers associated with CLIENT 3 and CLIENT 4 that it receives from switch 30a, 32a or 30b, 32b, respectively. Accordingly, in Stage 2, data transfers are routed through based on the client with which the data transfer is associated.

Stage 2 is the first arbiter that can base its decision on transfer credit availability. As described in the PCI Express Base Specification and U.S. application Ser. No. 11/324,352, filed Jan. 3, 2006 by the applicant of the present application, which application is incorporated herein by reference in its entirety, credits are a PCI Express-based concept of available memory space communication between two opposite sides of the PCI Express Link. If for example, there are no more credits available for a certain transfer type, the data transfer device 18 is not permitted to grant access to the link 16 through interface INT 24 to a client requesting that type of data transfer even if the client has data available.

The data transfer system described herein is capable of supporting a number of different modes of calculating if a particular transfer can be transferred based on credit availability. A first mode, MODE 1, requires each SW3 candidate (candidate is a transfer from a particular group's client based on SW1 decision) to perform necessary credit calculation for its data transfer packet size on its own. Each transfer candidate must assert a "GO" signal to SW2 informing it that the particular transfer (which is a transfer belonging to any of the same client's functions) has enough credits for its transfer. The stage between SW1 and SW2 (i.e., the FIFO stage) is responsible for asserting a GO signal not only when it has data available from SW1 but also when it has determined that there are enough data credits for that transfer to be safely transferred to the link 16 through interface INT 24. In MODE 1, however, the number of available credits can change as some transfers get preferential status through the entire arbitration. Once a transfer receives permission to access the PCI Express Link through the interface INT 24, its transmission will cause a reduction in the number of available credits. At that time, it is important for all other non-transferring transfer candidates to reevaluate their status vis-à-vis credit availability and in some cases deassert their already asserted GO signals. Therefore, the notion of available candidates is updated dynamically as the data transfer device 18 grants accesses to the PCI Express Link through interface INT 24.

A second mode, MODE 2, is based on a central processing unit ("CPU") 50 performing all credit calculations. The CPU 50 of the data transfer device 18 operates on SW3. CPU 50 operates on SW3 candidates because the vast number of SW2 candidates could considerably slow down the processing. That basically means, that each SW2 candidate asserts its GO signal whenever it has data to transfer. It, however, does not understand any notion of credits and their availability. SW2 switches also perform arbitration based on priorities but do not know about any credit notion. Once all SW2 switches have chosen their candidates to transfer there through, CPU 50 performs "masking" of certain clients. Masking means that certain SW3 clients will be disqualified based on lack of credit availability for them. The "masking" is not performed dynamically but rather at a "snapshot".

Figure 4:
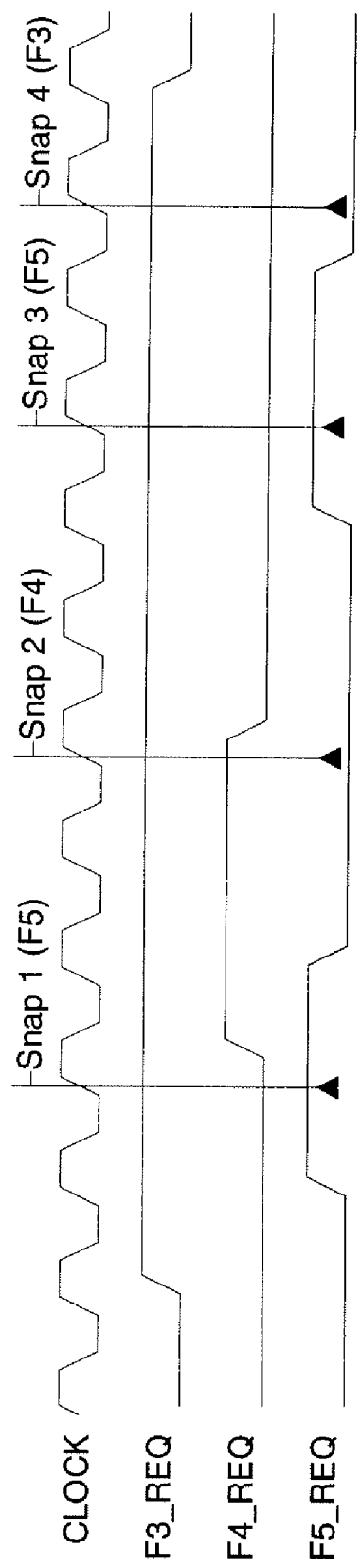
FIG. 4 is a timing diagram showing the assertion states of various transfer request signals of the system.

All switches (SW1, SW2, SW3, SW4) use the same "snap" scheme. The snap scheme is a method where each switch makes its decision of which dada transfer to pass only at a particular time, i.e., snap time. The snap time is a particular time when the data transfer device 18 is ready for the next grant of the PCI Express Link. This happens when the device is idle and then receives an indication that there is at least one client requesting to transfer its data, or it happens when the current transfer is completed and the CPU is ready to grant access to another candidate based on switch decisions at snap time. Once the arbitration is completed, the next snap time will happen once the current packet is fully transferred. No arbitration occurs between snap times. FIG. 4 is a timing diagram showing an example of how the snap scheme operates. As shown, each of clients 3, 4 and 5 asserts a transfer request signal, F3_REQ, F4_REQ, F5_REQ, respectively, when it is requesting access to the interface INT 24 for a data transfer. In a scheme where priority within a switch SW is F5, F4, F3, it is shown that, at Snaps 1 and 3, where F5_REQ and F3_REQ are asserted, F5 will be granted access. At Snap 2, where F4_REQ and F3_REQ are asserted, F4 will be granted access, and at Snap 4, where only F3_REQ is asserted, F# will be granted access.

Accordingly, at a snap, SW2 will take all unmasked candidates and it will choose the best suitable one based on the arbitration scheme in place. Since the ultimate decision of the switches is made at the snapshot, the SW4 switch 38 will also base its arbitration decision on the SW3 freshly chosen candidates and suddenly SW3 and SW4 will be available for one candidate. MODE 2 is may be preferred in the case where gate count is more of a concern than latency or bandwidth. In MODE 2, the SW2 switches have an ability to push the first word of a packet one pipeline stage closer to the ultimate destination resulting in 1 clock latency saving.

Stage 3 includes a switch 36 or SW3 that receives, as inputs, the outputs of switches 34a and 34b. Therefore, switch 36 receives both posted data transfers and non-posted data transfers. SW3 also receives, from CLIENT 2, completion data transfers. As is described with reference to FIG. 3, SW3 routes data transfers based on an arbitration scheme that can either select data transfers from clients in a "round robin" manner or, one or more data transfer types may be given a higher priority over other data transfer types. Accordingly, in Stage 3, data transfers are routed through based on the type of the data transfer.

SW3 switch 36 closely monitors credit availability. SW3 switch 36 will only transfer candidates and their corresponding packets for which there are enough credits to successfully complete the transmission to the other side of the PCI Express Link through interface INT 24. If for example, there is a posted packet waiting at switch 36 (GO signal for that packet is given) but the CPU 50 does not show enough credits for that transfer, the particular transfer will not be considered as a transfer candidate. So, the transfer will not receive an access to the next stage.

Stage 4 includes a switch 38 or SW1 that receives, as inputs, the outputs of switch SW3. Therefore, switch 38 receives posted data transfers, non-posted data transfers and completions from SW3. SW4 also receives, from CLIENT 1, low latency data transfers. As is described with reference to FIG. 3, SW4 routes data transfers based on an arbitration scheme that gives the highest priority to the low latency data transfers from CLIENT 1 over the other data transfer types receives from SW3. SW4 is a pure priority arbiter that gives an absolute priority to Function 1. In fact, SW1 might starve other functions if the priority Function 1 is always ready to transfer and the CPU 50 always shows enough available credits for Function 1 transfers. In the event that no data transfers from CLIENT 1 are requesting transfer through SW1, SW1 routes data transfers based on an arbitration scheme that can either select data transfers from SW3 in a "round robin" manner or, one or more data transfer types may be given a higher priority over other data transfers. Accordingly, in Stage 4, CLIENT 1 data transfers are given top priority for transfer there through.

SW4 switch 38 implies that the credit calculation, availability, and notification has already taken place before its stage (inside SW3 and Function 1 itself). So, when this switch 38 receives a request for transfer through GO signal it assumes the particular function already determined that there are enough credits for the transfer. Not having to recalculate and distribute credits again, SW4 is a very efficient switch with virtually no arbitration delay.

All switches are easily programmable by those of ordinary skill in the art and independently monitored. One possible configuration is described in Table 1 below. The table shows all switches, clients they operate on, and priority schemes they use.

TABLE 1

Switch Arbitration Scheme

| Switch | Functionality | Arbitration Scheme |
|---|---|---|
| SW4 | Input 1:F1<br>Input 2:F2-F5x<br>Arbitrates among F1 and F2-F5x | Priority arbiter:gives an absolute priority in the following order:<br>F1<br>F2-F5x |
| SW3 | Input 1:Posted (P)<br>Input 2:Non-Posted (NP)<br>Input 3:Completion (CPL)<br>Arbitrates among different transfer types | Round-robin arbiter (provided enough credits) |
| SW2 | Input 1:F5 (particular transfer type)<br>Input 2:F4 (particular transfer type)<br>Input 3:F3 (particular transfer type)<br>Arbitrates among different functions with the transfers of the same type | Priority arbiter:<br>F5 absolute priority<br>F3 and F4 round-robin (flip-flop) |
| SW1 | Input 1:Fxa<br>Input 2:Fxb<br>Input 3:Fxc<br>Input 4:Fxd<br>Arbitrates among functions of the same group and the same transfer type | Arbitration scheme is:<br>A -> D -> B -> D -> C -> D -> A<br>Therefore, function D will have 50% of BW allocated. The rest will operate in round-robin fashion. |

Figure 3:
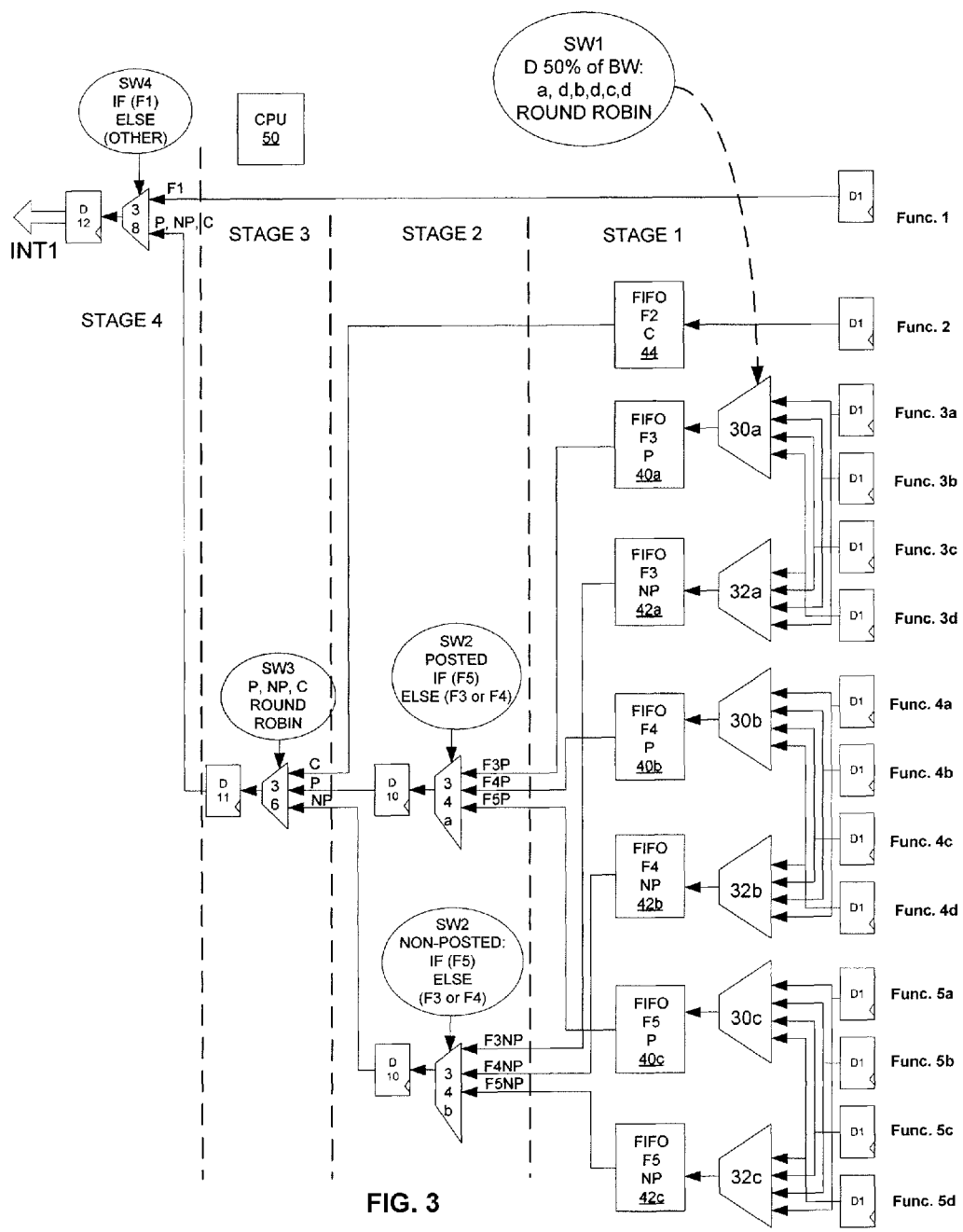
FIG. 3 is a more detailed schematic diagram of the data transmission system showing the switches that route data transfer packets from the clients to the transmission link.

FIG. 3 is a more detailed schematic block diagram that shows how data transfers are routed through the data transfer device 18. As shown in FIG. 3, data transfers associated with each function are input to a flip flop D1 before being transferred into the appropriate switch. Posted data transfers originating from functions 3a, 3b, 3c and 3d are transferred into switch 30a and non-posted data transfers originating from function 3a, 3b, 3c and 3d are transferred into switch 32a. Similarly, posted data transfers originating from functions 4a, 4b, 4c and 4d are transferred into switch 30b and non-posted data transfers originating from function 4a, 4b, 4c and 4d are transferred into switch 32b and posted data transfers originating from functions 5a, 5b, 5c and 5d are transferred into switch 30c and non-posted data transfers originating from function 5a, 5b, 5c and 5d are transferred into switch 32c.

In the implementation shown, the arbitration scheme of SW1, which is applied to each of switches 30a-30c and 32a-32c, data transfers associated with function d of each client are allocated 50 percent bandwidth and the data transfers associated with the remaining functions are chosen in a round robin manner. The data transfers output by switches 30a-30c and 32a-32c are input to FIFO devices 40a-40c and 42a-42c, respectively. The data transfers input to the FIFOs 40a, 40b and 40c are then input to switch 34a of Stage 2 and the data transfers input to the FIFOs 40a, 40b and 40c are then input to switch 34b.

As shown in FIG. 3, the inputs to switch 34a are indicated as F3P, F4P and F5P, representing posted data transfers from CLIENT 3, CLIENT 4 and CLIENT 5, respectively, and the inputs to switch 34b are indicated as F3NP, F4NP and F5NP, representing non-posted data transfers from CLIENT 3, CLIENT 4 and CLIENT 5, respectively. In this example, switches 34a and 34b of Stage 2 operate according to an arbitration scheme SW2 give top priority to data transfers from CLIENT 5, i.e., switch 34a gives priority to transfers F5P and switch 34b gives top priority to transfers F5NP. Switches 34a and 34b then chose among data transfers from CLIENT 3 and CLIENT 4. The data transfers selected by each switch 34a, 34b are then input to a flip flop DI0 prior to being input to Stage 3.

Stage 3 includes switch 36, which receives the output of switch 34a, which is a posted transfer P, and the output of switch 34b, which is a non-posted transfer P. Switch 36 also receives, from FIFO 44, completion data transfers from CLIENT 2. Switch 36 of Stage 3 operates according to an arbitration scheme that chooses between the data transfers P, NP and C in a round robin manner. The selected transfer is output to flip flop D11 prior to being input to Stage 4.

Stage 4 includes switch 38, which receives the output of switch 36, which is one of a posted P, non-posted NP and completion C transfer. Switch 38 also receives the low latency data transfer from CLIENT 1. Switch 38 of Stage 4 operates according to an arbitration scheme that gives top priority to the low latency data transfer F1 from CLIENT 1. If no transfer F1 is input to switch 38, it chooses between the data transfers P, NP and C in a round robin manner. The selected transfer is output to flip flop D12 prior to being transferred to interface INT 24.

Table 2 shows another possible configuration for the data transfer device 18, using SW1, SW2, SW3, and SW4 prioritizes different functions (clients). Therefore, although the arbitration is distributive, the final arbitration scheme is clear and well achievable using all the switches.

TABLE 2

Arbitration Priority Scheme

| Function | Higher priority Functions | Lower priority Functions | Possibly starved functions | Comment |
|---|---|---|---|---|
| Function 1 | None | All | All | Function 1 has the highest priority of all. |
| Function 2 | Function 1 | None | None | Function 2 can issue only Completion transfers that compete in a round-robin fashion with Posted transfers and Non-posted transfers. |
| Function 3x | Function 1, Function 5x | None | None | Function 3x and 4x have equal priorities. |
| Function 4x | Function 1, Function 5x | None | None | Function 3x and 4x have equal priorities. |
| Function 5x | Function 1 | Function 3x Function 4x | Function 3x Function 4x | Function 5 (along with Function 2) has the second highest priority (after Function 1). |

The data transfer device described is unique in following ways:

Distributed Arbitration—which means that the arbitration is not based on a single large arbiter but rather a set of smaller arbiters each having its own arbitration logic. Algorithms driving those smaller arbiters are simpler, easier to change without affecting the rest of the arbitration, scalable in terms of adding more functions, and they can work independently from the other arbiters. The distributed arbitration creates an unique environment in which all arbitration logic is distributed among smaller arbiters working efficiently on their results, with those results being eventually collected by the CPU of the device, interpreted and eventually the final result (grant access to one of the functions) is carried out.

Dynamic Operation—which means that, although the arbiter decision is made at the time snapshot, the preparation of results, checking of available credits and other important arbiter mechanisms are running dynamically as input changes. The arbiter's dynamic component speeds up the decision process and eliminates the inefficiency created by correct information not being ready for the arbitration at the time of snapshot, when the arbitration decision is made and communicated to all functions (clients).

Snapshot Feature—which means that the arbiter makes a decision at a certain clock, i.e., the snapshot. At that time, a snapshot of all arbiters and functions (clients) is taken and an arbitration decision is generated. Once the decision is communicated to all clients, the arbiter will not make another decision until the client with granted access has finished the transfer. So, from the time the granting client has started the transfer until the time it finishes its transfer, no other final decision will be made. The distributed nature of the device allows distributed arbiters to make their own decisions at their independent snapshot times and their results might oscillate but the final decision will be made upon arbiters' results available at the main snapshot.

Arbitration Schemes—the arbitration schemes are designed to support expedited traffic through the device's low latency paths. The device also supports prioritizing among different transfer types, and different groups of functions. Overall, the arbitration schemes used in the device allow a maximum control over clients' priorities when accessing the PCI Express Link. The details of programming the arbitration schemes are known to those of ordinary skill in the art.

Scalability and Adaptability—The device is architected in the way that allows an easy implementation of additional clients (functions). Due to its distributed nature, it is also designed in a way to easily change its arbitration logic making it very adaptable to common arbiter's prioritization policy changes through the design process.

The system and method described herein may find applicability in any computing or processing environment. The system and method may be implemented in hardware, software, or a combination of the two. For example, the system and method may be implemented using circuitry, such as one or more of programmable logic (e.g., an ASIC), logic gates, a processor, and a memory.

The system and method may be implemented in computer programs executing on programmable computers that each includes a processor and a storage medium readable by the processor (including volatile and non-volatile memory and/or storage elements). Each such program may be implemented in a high-level procedural or object-oriented programming language to communicate with a computer system and method. However, the programs can be implemented in assembly or machine language. The language may be a compiled or an interpreted language.

Each computer program may be stored on an article of manufacture, such as a storage medium (e.g., CD-ROM, hard disk, or magnetic diskette) or device (e.g., computer peripheral), that is readable by a general or special purpose programmable computer for configuring and operating the computer when the storage medium or device is read by the computer to perform the functions of the data framer interface. The system and method also may be implemented as a machine-readable storage medium, configured with a computer program, where, upon execution, instructions in the computer program cause a machine to operate to perform the functions of the system and method described above.

Implementations of the system and method may be used in a variety of applications. Although the system and method is not limited in this respect, the system and method may be implemented with memory devices in microcontrollers, general-purpose microprocessors, digital signal processors (DSPs), reduced instruction-set computing (RISC), and complex instruction-set computing (CISC), among other electronic components.

Implementations of the system and method may also use integrated circuit blocks referred to as main memory, cache memory, or other types of memory that store electronic instructions to be executed by a microprocessor or store data that may be used in arithmetic operations.

The invention may be embodied in other specific forms without departing from the spirit or essential characteristics thereof. For example, the number of clients in the system; the number of functions associated with each client; and the number of low latency functions are arbitrary and therefore, any number or combination of these devices may be utilized with the invention. The specific arbitration schemes may also be varied according to the needs of the system within which the device operates.

Furthermore, while the invention is described as applying to the PCI Express protocol, it will be understood that the inventive concept of arbitrating multiple data transfers from multiple clients to a shared common resource may be applied to any data transfer system or protocol in which the ability to arbitrate multiple data transfers from multiple clients to a shared common resource is desired.

The present embodiments are therefore to be considered in respects as illustrative and not restrictive, the scope of the invention being indicated by the appended claims rather than by the foregoing description, and all changes which come within the meaning and range of the equivalency of the claims are therefore intended to be embraced therein.

The invention claimed is:

1. A data packet arbitration system for routing data transfers from a plurality of clients to a data transmission line, each client including a plurality of functions initiating data transfers, the system comprising:

a first arbitration stage including a first switch device receiving data transfers of a first type from the plurality of functions of each of the plurality of clients and a second switch device receiving data transfers of a second type from the plurality of functions of each of the plurality of clients, the first and second switch devices outputting data transfers of the first and second types, respectively;

a second arbitration stage including a third switch device receiving data transfers of the first type from the first switch device and a fourth switch device receiving data transfers of the second type from the second switch device, the third and fourth switch devices outputting data transfers of the first and second types, respectively;

a third arbitration stage including a fifth switch device receiving data transfers of the first type from the third switch device, data transfers of the second type from the fourth switch device, and data transfers of a third type from at least one of the plurality of clients; and a fourth arbitration stage including a sixth switch device receiving data transfers of the first, second and third types from the fifth switch device and low latency data transfers from at least one of the plurality of clients, the fourth arbitration stage outputting data transfers to the data transmission line;

wherein data transfers are routed through the system based on arbitration logic that prioritizes by function in the first arbitration stage and by client in the second arbitration stage.

2. The system of claim 1 wherein the first switch device includes a plurality of routing devices, each routing device receiving data transfers of the first type from an associated client, each routing device therefore receiving data transfers of the first type from functions included in the associated client and outputting data transfers to the third switch device.

3. The system of claim 2 wherein each routing device outputs data transfers to the third switch device in an order based on an arbitration scheme that is programmable to favor certain functions of the associated client over others.

4. The system of claim 3 wherein the third switch device outputs data transfers to the fifth switch device in an order based on an arbitration scheme that is programmable to favor certain clients over others.

5. The system of claim 4 wherein the fifth switch device outputs data packets to the sixth switch device in an order based on an arbitration scheme that is programmable to favor certain data transfer types over others.

6. The system of claim 5 wherein the sixth switch device outputs data packets to the data transmission line in an order that favors low latency data packets over the first, second and third data transfer types.

7. The system of claim 1 wherein the first type of data transfer is a write data transfer and the second type of data transfer is a read data transfer.

8. The system of claim 7 wherein the third type of data transfer is a completion data transfer.

* * * * *